US012721705B2

(12) United States Patent
Yamane et al.

(10) Patent No.: US 12,721,705 B2
(45) Date of Patent: Sep. 1, 2026

(54) PROCESSING BLOCK, HOLDER FOR PROCESSING BLOCK, AND METHOD OF POSITIONING PROCESSING BLOCK

(71) Applicant: TOKUYAMA DENTAL CORPORATION, Tokyo (JP)

(72) Inventors: Shintaro Yamane, Tokyo (JP); Yuukou Nagasawa, Tokyo (JP)

(73) Assignee: TOKUYAMA DENTAL CORPORATION, Tokyo (JP)

( * ) Notice: Subject to any disclaimer, the term of this patent is extended or adjusted under 35 U.S.C. 154(b) by 679 days.

(21) Appl. No.: 17/787,594

(22) PCT Filed: Nov. 10, 2020

(86) PCT No.: PCT/JP2020/041968
§ 371 (c)(1),
(2) Date: Jun. 21, 2022

(87) PCT Pub. No.: WO2021/131362
PCT Pub. Date: Jul. 1, 2021

(65) Prior Publication Data

US 2022/0409349 A1 Dec. 29, 2022

(30) Foreign Application Priority Data

Dec. 24, 2019 (JP) ................................ 2019-232660

(51) Int. Cl.
*A61C 13/00* (2006.01)

(52) U.S. Cl.
CPC ...... *A61C 13/0027* (2013.01); *A61C 13/0004* (2013.01)

(58) Field of Classification Search
CPC ........... A61C 13/0004; A61C 13/0022; A61C 13/0027; A61C 13/12

(Continued)

(56) References Cited

U.S. PATENT DOCUMENTS 7,604,759 B2 10/2009 Gubler et al.
8,141,217 B2 3/2012 Gubler et al.
(Continued)

FOREIGN PATENT DOCUMENTS

CN 203898759 U 10/2014
CN 107427346 A 12/2017
(Continued)

OTHER PUBLICATIONS

Office Action in RU Application No. 2022120086, dated Nov. 16, 2022 15pp.

(Continued)

*Primary Examiner* — Brian D Keller
*Assistant Examiner* — Aaron R McConnell
(74) *Attorney, Agent, or Firm* — HAUPTMAN HAM, LLP

(57) ABSTRACT

A holding surface is formed by an inclined surface formed from the upper edge of a flange of a disk-shaped processing block to a workpiece portion. The processing block is accommodated in an annular holding member, a pressing-side holding member is advanced with respect to an accommodating side holding member, and the facing peripheral edge of the pressing side holding member is brought into contact with the holding surface. Since the facing peripheral edge abuts on a circle centered around the axis of the holding surface formed by a conical side surface, the axis of the annular holding member and the axis of the processing block coincide with each other in a processing apparatus, and the processing block is set at a predetermined position.

3 Claims, 10 Drawing Sheets

(58) Field of Classification Search
USPC .......................................................... 269/287
See application file for complete search history.

(56) References Cited

U.S. PATENT DOCUMENTS

| | | | | |
|---|---|---|---|---|
| 9,675,433 | B2 * | 6/2017 | Cornell | B23Q 3/06 |
| 10,219,880 | B2 | 3/2019 | Rolf et al. | |
| 2007/0275352 | A1 | 11/2007 | Gubler et al. | |
| 2010/0028836 | A1 | 2/2010 | Gubler et al. | |
| 2015/0174716 | A1 * | 6/2015 | Suyama | A61C 13/12 269/58 |
| 2015/0238291 | A1 | 8/2015 | Hauptmann et al. | |
| 2016/0228222 | A1 | 8/2016 | Rolf et al. | |
| 2017/0020639 | A1 | 1/2017 | Jahns et al. | |
| 2017/0216000 | A1 | 8/2017 | Jahns et al. | |
| 2018/0064515 | A1 | 3/2018 | Ito et al. | |
| 2018/0243055 | A1 | 8/2018 | Ito et al. | |
| 2022/0226084 | A1 | 7/2022 | Jahns et al. | |

FOREIGN PATENT DOCUMENTS

| | | | |
|---|---|---|---|
| DE | 202013103515 | U1 | 11/2013 |
| JP | 20125874 | A | 1/2012 |
| JP | 2005319553 | A | 11/2015 |
| JP | 2016535610 | A | 11/2016 |
| JP | 2017109036 | A | 6/2017 |
| KR | 101528355 | B1 | 6/2015 |
| RU | 2607951 | C2 | 1/2017 |
| RU | 2685716 | C2 | 4/2019 |
| RU | 2698021 | C1 | 8/2019 |
| WO | 2016148288 | A1 | 9/2019 |

OTHER PUBLICATIONS

Extended European Search Report in EP Application No. 20907974.8 dated Dec. 13, 2023, 7pp.

Office Action in CN Application No. 202080076318.1, dated Jan. 30, 2024, 14pp.

* cited by examiner

PROCESSING BLOCK, HOLDER FOR PROCESSING BLOCK, AND METHOD OF POSITIONING PROCESSING BLOCK

RELATED APPLICATIONS

The present application is U.S. national stage of application No. PCT/JP2020/041968, filed on Nov. 10, 2020, and claims priority based on Japanese Patent Application No 2019-232660, filed Dec. 24, 2019.

TECHNICAL FIELD

The present invention relates to a processing block, a holder for the processing block, and a method of positioning the processing block to be machined such as cut and polished while being held by a processing device and changing its posture.

BACKGROUND ART

Dental prostheses as dental products used in dental treatment are molded from, for example, metal materials such as gold, silver, palladium alloy or the like by casting, or machined from a processing block made of ceramics such as zirconia or the like, titanium, hybrid resin or the like by cutting, polishing, or the like to be formed into a desired shape. The hybrid resin may be a composite material in which inorganic filler is dispersed in a resin matrix at a high density.

With the development of digital imaging technology and computer processing technology in recent years, as disclosed in patent literature PTL 1 for example, it becomes popular to use CAD/CAM systems that process dental prostheses by cutting processing blocks based on images taken in the oral cavity, using CAD/CAM devices based on computer-aided design (CAD) and computer-aided manufacturing (CAM) technology.

Since it is processed by a CAD/CAM device, a processing block to be processed into a dental prosthesis may be referred to as a dental CAD/CAM block or a mill blank. A processing block having a disk shape may be referred to as a CAD/CAM processing disk or the like. Such a CAD/CAM processing disk is suitable for manufacturing a plurality of dental prostheses or for manufacturing a large dental prosthesis formed over a plurality of teeth.

In PTL 2, a CAD/CAM processing disk is shown as a dental mill blank.

For supplying a disk-shaped processing block on a processing device, the circle axis of the processing block must be aligned with the axis of the processing device, where is the criterion for processing. If not, the processing block may not be processed into the dental prosthesis in desired shape, and the material of the processing block may be wasted. As shown in PTL 3 for example, the processing device is provided with an "annular holding device 4" for holding a "disk-shaped raw product 3" which is a processing block, and the "raw product 3" is needed to be held in a predetermined position of the "holding device 4." For example, the central axis of the "disk-shaped raw product 3" must be aligned with the central axis of the "annular holding device 4". That is, by aligning those central axes with each other, the "raw product 3" can be positioned at a predetermined position with respect to the reference of the processing device and can be subjected to desired processing.

The holding device is composed of a pair of annular holding members as a structure for holding a disk-shaped processing block such that the pair of annular holding members hold peripheral edges of the respective disk surfaces of the disk to sandwich the disk.

FIGS. 14A and 14B show a processing block 100 which is a disk-shaped CAD/CAM processing disk, wherein FIG. 14A is a perspective view and FIG. 14B is a front view.

The processing block 100 comprises a columnar workpiece 101 from which a dental prosthesis is formed and a flange 102 having a diameter larger than that of the workpiece 101 are formed in the central portion of the workpiece 101. The workpiece 101 and the flange 102 are integrally molded with a material such as ceramics, titanium, a hybrid resin, or the like.

CITATION LIST

Patent Literature

[PTL 1]: JP 2016-535610 A
[PTL 2]: JP 2017-109036 A
[PTL 3]: JP 2012-5874 A

SUMMARY OF INVENTION

Technical Problem

When the above-mentioned processing block 100 is supplied on the holding device of the processing device, axis aligning between the processing block 100 and the processing device causes a difference depending on the operator, and the deviation between the axes may become out of tolerance. Since the processing on the processing block 100 is performed based on the axis of the processing device, the desired shape and number of dental prostheses cannot be processed due to the deviation between the axes center, and there is a risk of processing errors.

The present invention aims to provide a processing block which can be easily held in a predetermined position when the processing block is held by a holding device of a processing device, a holder for the processing block, and a method of positioning the processing block.

Solution to Problem

On a viewpoint of the above-mentioned problem to be solved for a processing block to be held in a predetermined position, a the disk-shaped processing block to be held by a holding device and processed into a product in a desired shape is characterized by comprising: a columnar workpiece; a flange protruding from the peripheral surface of the workpiece; and a holding surface provided on the flange and positioned by abutting a facing peripheral edge of a pressing side holding member provided on the holding device; wherein, at least a part of the holding surface is inclined with respect to the axis of the processing block.

According to another aspect of the invention, it is preferable in the above-mentioned processing block that the holding surface is provided so as to form a part of a side surface of a cone.

According to another aspect of the invention, it is preferable in the above-mentioned processing block that the holding surface is provided in a curved surface.

According to another aspect of the invention, it is preferable in the above-mentioned processing block that the processing block is a dental CAD/CAM block.

On a viewpoint for ensuring the above-mentioned processing block to be reliably held, a holder for a processing block according to the present invention comprises: a disk-shaped processing block; and an annular holding member for holding the processing block for the processing block to be processing into a product in a desired shape; wherein: the annular holding member includes: an accommodating side holding member arranged on one side in the axial direction of the processing block; and a pressing side holding member arranged on the other side in the axial direction; the accommodating side holding member and the pressing side holding member are provided with an engaging mechanism that engages and disengages the accommodating side holding member and the pressing side holding member; and the processing block includes: a columnar workpiece; a flange protruding from the peripheral surface of the workpiece; and a holding surface provided on the flange and positioned by abutting a facing peripheral edge of a pressing side holding member provided on the holding device; wherein, at least a part of the holding surface is inclined with respect to the central axis of the workpiece; and the pressing side holding member includes a facing peripheral edge pressing a part of the holding surface inclined when engaging with the accommodating side holding member.

On a viewpoint for ensuring the above-mentioned processing block to be aligned its axis to the axis of a processing device, a method of positioning a processing block according to the present invention is for holding the processing block by an annular holding member for the processing block to be processing into a product in a desired shape, wherein: the processing block includes: a columnar workpiece; a flange protruding from the peripheral surface of the workpiece; and a holding surface provided on the flange and inclined at least a part with respect to the central axis of the workpiece; the method is characterized by including: a first arranging step of arranging an accommodating side holding member provided on the annular holding member on one side in the axial direction of the processing block; a second arranging step of arranging a pressing side holding member provided on the annular holding member and being able to engage and disengage with the accommodating side holding member on the other side in the axial direction of the processing block after the first arrangement step; and a positioning step of positioning the processing block by engaging the pressing side holding member with the accommodating side holding member to make a facing peripheral edge of the pressing side holding member abut on the holding surface.

As the engaging mechanism between the accommodating side holding member and the pressing side holding member, it may be adopted, for example, a screw structure in which a screwed portion is machined, a fastener structure in which two parts are fastened each other with a fastener such as a bolt or a nut, a clamping structure in which two parts are fixed by a clamping mechanism using a spring or the like.

Effect of Invention

When the processing block, the processing block holder, and the method of positioning the processing block according to the present invention are provided to the processing device, the axis used as the processing reference of the processing device and the axis of the processing block can be easily aligned so that it is possible to reduce the occurrence of processing mistakes and waste of the material during processing.

DESCRIPTION OF EMBODIMENTS

Hereinafter, it will be described a processing block, a holder for the processing block or processing block holder, and a method of positioning the processing block according to the present invention will be described with referring each embodiment shown in the attached drawings. Although there is no limitation on the material used for the processing block, it will be exemplified in the following embodiments processing blocks made of materials commonly used as dental prostheses, such as zirconia, lithium disilicate and the like, metal materials such as titanium, cobalt chrome and the like, and resin-based materials such as PMMA, PEEK, hybrid resin and the like, and wax-based materials.

First Embodiment

Figure 1:
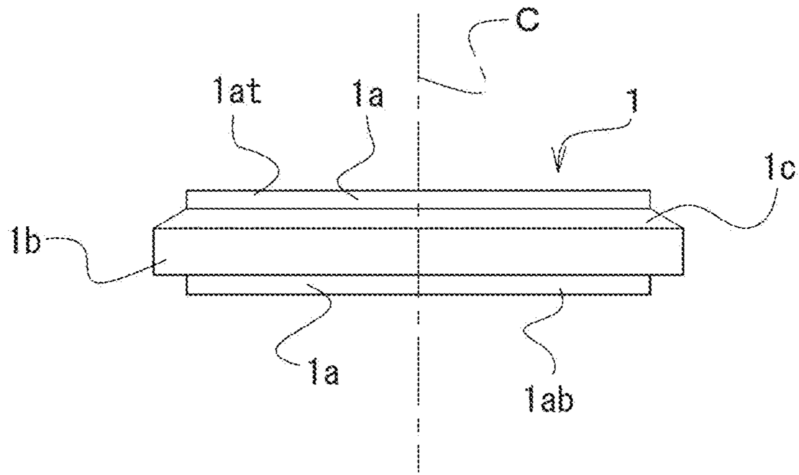
FIG. 1 It is a front view of a processing block according to the first embodiment of this invention.
Figure 2:
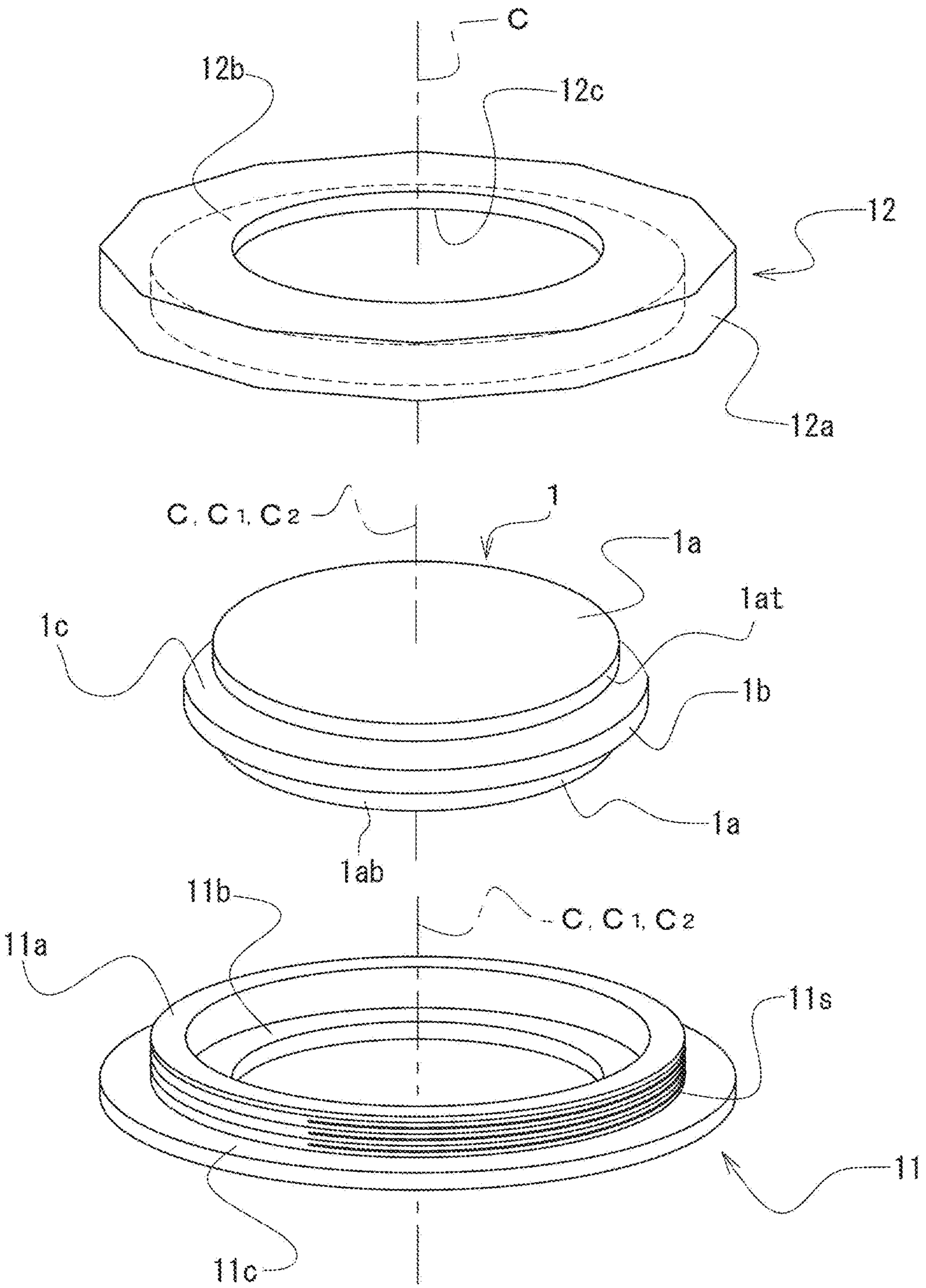
FIG. 2 It is a perspective view for explaining a state where the processing block according to the first embodiment is held by an annular holding member, showing the annular holding member and the processing block separately.
Figure 3A:
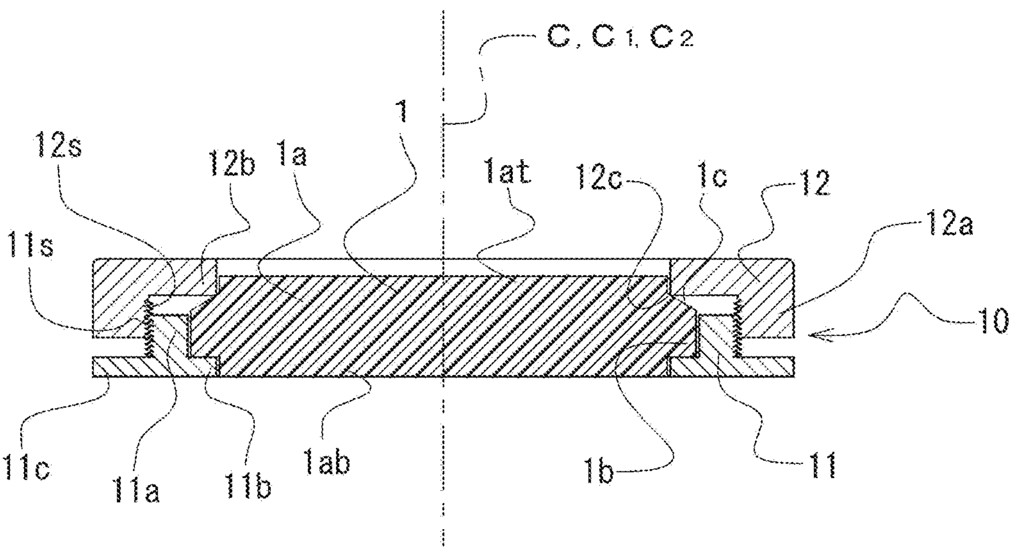
FIG. 3A It is a cross-sectional view showing a state where the processing block according to the first embodiment is held by the annular holding member, cut along a plane including the axis of the processing block.
Figure 3B:
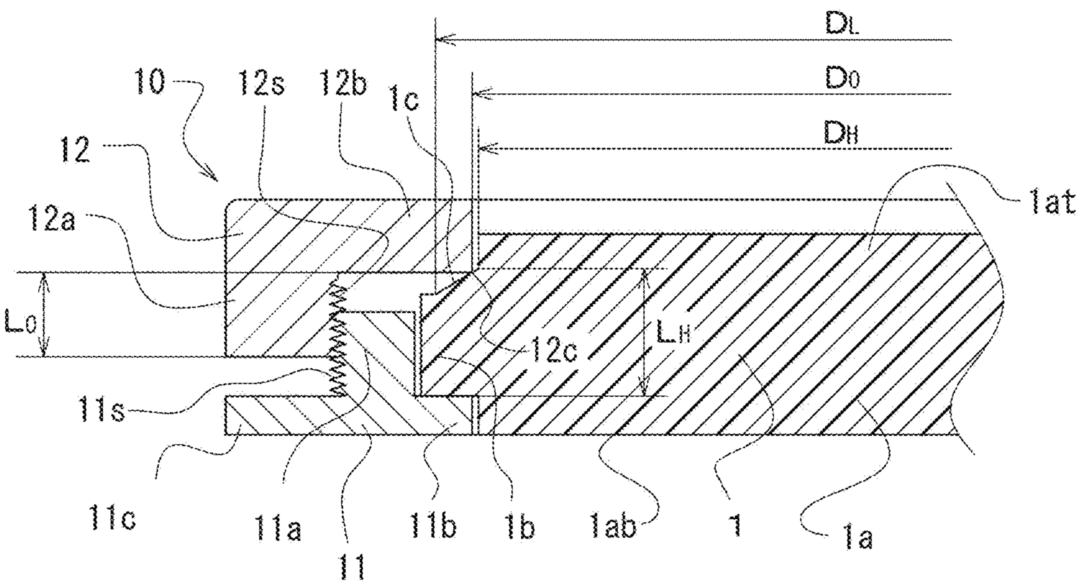
FIG. 3B It is an enlarged cross-sectional view showing a part of FIG. 3A.

FIGS. 1, 2, 3A and 3B show a processing block 1 according to the first embodiment of the present invention. FIG. 1 is a front view of the processing block 1, and FIG. 2 is a perspective view of an accommodating side holding member 11 and a pressing side holding member 12 separately, where the members 11 and 12 comprise an annular holding member 10 (see FIGS. 3A and 3B) which is a processing block holder for holding the processing block 1. FIG. 3A is a cross-sectional view of the processing block 1 held by the accommodating side holding member 11 and the pressing side holding member 12 cut along the plane including the axis of the processing block 1. FIG. 3B is an enlarged cross-sectional view showing a part of FIG. 3A.

In the processing block 1, a columnar workpiece 1*a* and a flange 1*b* arranged in the center of the workpiece 1*a* and having a diameter larger than that of the workpiece 1*a* are integrally formed. Since the flange 1*b* is formed in the central portion, both ends of the workpiece 1*a* project from the flange surface of the flange 1*b*. The upper surface of the flange 1*b* is provided with an outer peripheral edge of the flange 1*b* and a holding surface 1*c* which is an inclined surface to the upper protrusion 1*at* of the workpiece 1*a* extending upward from the flange surface. On the holding surface 1*c*, a pressing side holding member 12 faces as described later. In this description, it is defined the side of the processing block 1 facing the pressing side holding member 12, that is, the side on which the upper protrusion 1*at* is arranged as the upper side. Below the flange surface of the flange 1*b* at the lower portion of the workpiece 1*a*, a lower protrusion lab protrudes. The inclined surface forming the holding surface 1*c* is formed on the side surface of a cone whose apex is located on the axis C of the processing block 1. As shown in FIG. 1, the apex of this cone is located on the pressing side holding member 12 side of the flange 1*b*, that is, on the upper side. Since it is the side surface of the cone, the position in the holding surface 1*c* and on the circle centered on the appropriate position on the axis C of the processing block 1 is constant in the distance from the lower surface of the flange 1*b*.

Although in FIGS. 1, 2, 3A and 3B, the holding surface 1*c* is shown as being formed from the outer peripheral end of the flange 1*b* to the workpiece 1*a*, the holding surface 1*c* may be formed such that the lower end thereof is arranged at a radial intermediate portion of the flange 1*b* and the holding surface 1*c* is formed from there to the workpiece 1*a*. The upper end of the holding surface 1*c* may be arranged at a radial intermediate portion of the flange 1*b* and the holding surface 1*c* extends from there to the outer peripheral end of the flange 1*b*. Further, the holding surface 1*c* may be provided only at a radial intermediate portion of the flange 1*b*.

The inclination angle of the holding surface 1*c* may be within the range of 3 to 87 degrees, preferably 5 to 85 degrees, and more preferably 10 to 80 degrees with respect to the axis C of the processing block 1.

The accommodating side holding member 11 is formed by a cylindrical accommodating main body 11*a* centered on an axis C1, an accommodating flange 11*b* provided at the lower portion of the accommodating main body 11*a*, and an outer flange 11*c*. The accommodating main body 11*a* is provided on the outer surface with a male screw 11*s* constituting an engaging mechanism.

The accommodating flange 11*b* is formed by an inner flange projecting inward from the accommodating main body 11*a*. The flange 1*b* of the processing block 1 is placed on the upper surface of the accommodation flange 11*b*. That is, the inner diameter of the accommodating flange 11*b* is smaller than the outer diameter of the flange 1*b*. The outer diameter of the flange 1*b* is smaller than the inner diameter of the accommodating main body 11*a*. With the flange 1*b* mounted on the accommodation flange 11*b*, the lower protrusion lab of the workpiece 1*a* is inserted inside the accommodation flange 11*b*.

The outer flange 11*c* is formed so as to project outward from the accommodating main body 11*a*. The outer flange 11*c* is a portion facing the lower surface of an engaging main body 12*a* described later.

A pressing side holding member 12 is formed by a cylindrical engaging main body 12*a* centered on an axis C2 and a pressing flange 12*b*. On the inner surface of the engaging main body 12*a*, there is formed a female screw 12*s* constituting an engaging mechanism to be screwed with the male screw 11*s* of the accommodating side holding member 11. The outer peripheral surface of the engaging main body 12*a* has an appropriate shape, for example, a knurled eye, a polygonal shape, a corrugated shape, or the like so that the operator can easily grip it. When a jig is used, the outer peripheral surface of the engaging main body 12*a* has a shape that engages with the jig used.

In this embodiment, it will be exemplified a screwed structure as the engaging mechanism in which a male screw 11*s* and a female screw 12*s* are combined.

The pressing flange 12*b* is formed by an inner flange protruding inward from the upper portion of the engaging main body 12*a*. At an end portion of the inner peripheral surface of the pressing flange 12*b* on the processing block 1 side, there is formed a facing peripheral edge 12*c*. The facing peripheral edge 12*c* is a portion that comes into contact with the holding surface 1*c* in a state where the processing block 1 is held by the annular holding member 10.

In order for the facing peripheral edge 12*c* to come into contact with the holding surface 1*c*, the following formulae 1 and 2 is satisfied.

$$D_H < D_O < D_L \quad \text{(Formula 1)}$$

$$L_O < L_H \quad \text{(Formula 2)}$$

In these formulae 1 and 2, with reference to FIG. 3B, $D_O$ is the diameter of the facing peripheral edge 12*c*, and $D_H$ is the outer diameter of the upward protrusion 1*at*, and $D_L$ is the diameter of the outer peripheral end of the holding surface 1*c*. $L_H$ is the distance between the inner peripheral end of the holding surface 1*c* and the lower surface of the flange 1*b*, and $L_O$ is the distance between the facing peripheral edge 12*c* and the lower surface of the engaging main body 12*a*.

The above-mentioned accommodating side holding member 11 is attached to a holding device of a processing device (not shown), and the accommodating side holding member 11 is adapted to change its posture in three dimensions by this holding device. The axis C1 of the accommodating side holding member 11 has a predetermined positional relationship with the holding device, and for example, the axis C1 serves as a processing reference for the processing device when processing the processing block 1.

For holding the processing block 1 by the annular holding member 10, the processing block 1 is set up such that the lower protrusion lab of the workpiece 1*a* is accommodated inside the accommodation flange 11*b* of the accommodation side holding member 11 (first placement step). Then, the pressing side holding member 12 is put on to cover the accommodating side holding member 11 accommodating the processing block 1 (second arrangement step), and the female screw 12*s* of the engaging main body 12*a* is screwed over the male screw 11*s* of the accommodating main body 11*a*. By rotating the pressing side holding member 12, the pressing side holding member 12 advances with respect to the accommodating side holding member 11 so that the pressing side holding member 12 is tightened to the accommodating side holding member 11. By advancing the pressing side holding member 12, the facing peripheral edge 12*c* comes into contact with the holding surface 1*c* (positioning step). Since the facing peripheral edge 12*c* is in a plane orthogonal to the axis C2 of the pressing side holding member 12 and the holding surface 1*c* is formed on the side surface of the cone, it is necessary for rotating the pressing side holding member 12 with respect to the accommodating side holding member 11 smoothly that the tips of the corners constituting the facing peripheral edge 12*c* come into contact on a circle centered on the axis C of the cone of the holding surface 1*c*. For this reason, the processing block 1 is moved such that the gap between the accommodating side holding member 11 and the processing block 1 becomes even around the processing block 1. When the processing block 1 is sandwiched between the accommodating side holding member 11 and the pressing side holding member 12 by advancing the pressing side holding member 12, the facing peripheral edge 12*c* and the holding surface 1*c* are positioned such that the circle axis C2 of the facing peripheral edge 12*c* and the conical axis C of the holding surface 1*c* coincide with each other. On the other hand, the pressing side holding member 12 provided with the facing peripheral edge 12*c* and the accommodating side holding member 11 attached to the holding device are positioned such that the axis C1 and the axis C2 coincide with each other. Therefore, the axis C of the processing block 1 and the axis C1 of the accommodating side holding member 11 coincide with each other, and the processing block 1 is aligned at the axis with the processing reference of the processing device to be held at a predetermined position. Then, the processing applied to the processing block 1 by the processing device is performed at a predetermined position of the processing block 1. Therefore, it is possible to reduce the occurrence of processing mistakes and waste of materials.

Figure 4:
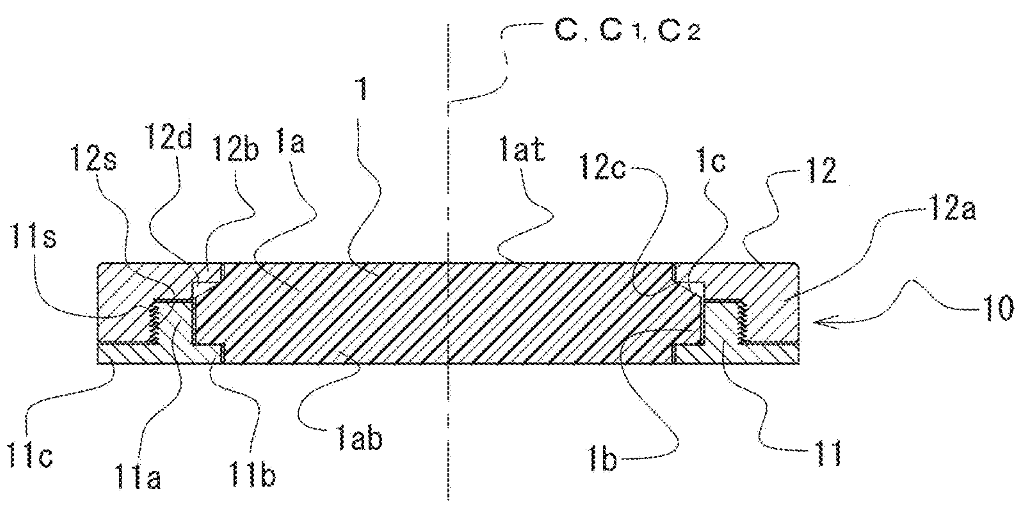
FIG. 4 It is a cross-sectional view showing a state where the processing block according to the first embodiment is held by the annular holding member of a shape different from the annular holding member shown in FIG. 3A and FIG. 3B, cut along a plane including the axis of the processing block.

By the way, as described above, the processing block 1 is to be positioned with the facing peripheral edge 12*c* in contact with the holding surface 1*c* so that the facing peripheral edge 12*c* may be formed on the inner peripheral surface of the pressing flange 12*b*. For example, as shown in FIG. 4, the lower end of the pressing flange 12*b* may be cut out from the inner peripheral surface side to provide a notch 12*d*. With this shape, the protrusion length of the upper portion of the engaging main body 12*a* protruding upward from the upper surface of the workpiece 1*a* can be reduced as compared with the case shown in FIGS. 3A and 3B.

Second Embodiment

Figure 5:
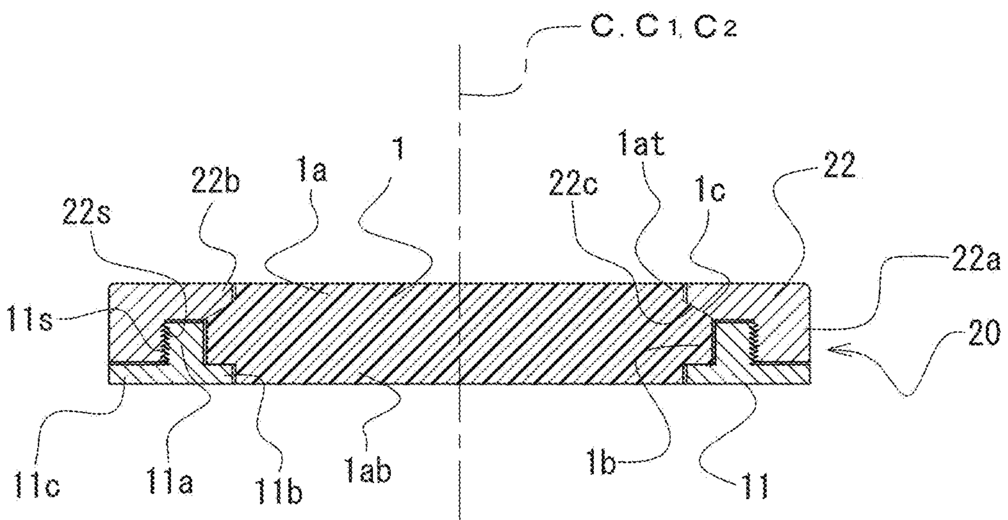
FIG. 5 It is a cross-sectional view showing a state where a processing block similar to that of the first embodiment is held by an annular holding member having a facing peripheral edge having a shape different from that of the first embodiment, according to the second embodiment of the present invention, cut along a plane including the axis of the processing block.

FIG. 5 is a cross-sectional view of the processing block 1 according to the second embodiment cut along the plane including the axis C of the processing block 1, wherein the same processing block 1 as in the first embodiment is held by the annular holding member 20 which is a processing block holder different from the first embodiment. The pressing side holding member 22 according to the second embodiment for pressing the processing block 1 is formed by the engaging main body 22*a* and the pressing flange 22*b*, similarly to the pressing side holding member 12 according to the first embodiment. The facing peripheral edge 22*c* of the pressing flange 22*b* according to the second embodiment is formed by the inner surface of a cone having a shape overlapping with the holding surface 1*c* of the processing block 1.

In the case where the facing peripheral edge 22*c* in this case has a cone shape overlapping the holding surface 1*c*, the inclination angle of the facing peripheral edge 22*c* may be within the range of 3 to 87 degrees, preferably 5 to 85 degrees, and more preferably 10 to 80 degrees, similarly to that of the holding surface 1*c*. The facing peripheral edge 22*c* may be provided at an inclination angle different from that of the holding surface 1*c*. The facing peripheral edge 22*c* may have a linear or curved cross-sectional shape cut along the plane including the axis C of the processing block 1, and have a shape including a straight line and a curved line.

Since the processing block 1 and the accommodating side holding member 11 are the same as the processing block 1 and the accommodating side holding member 11 according to the first embodiment, they are designated by the same reference numerals.

The accommodating side holding member 11 and the pressing side holding member 22 form an annular holding member 20.

In this second embodiment, by advancing the pressing side holding member 22 with respect to the accommodating side holding member 11, the inner side surface of the cone of the facing peripheral edge 22*c* comes to abut to and contact closely with the side surface of the cone of the holding surface 1*c*. Consequently, the axis C of the processing block 1 and the axis C1 of the accommodating side holding member 11 coincide with each other so that the processing block 1 and the processing device are aligned at those axes and the processing block 1 is set to be positioned at a predetermined position of the processing device.

Modified Example of the Second Embodiment

Figure 6:
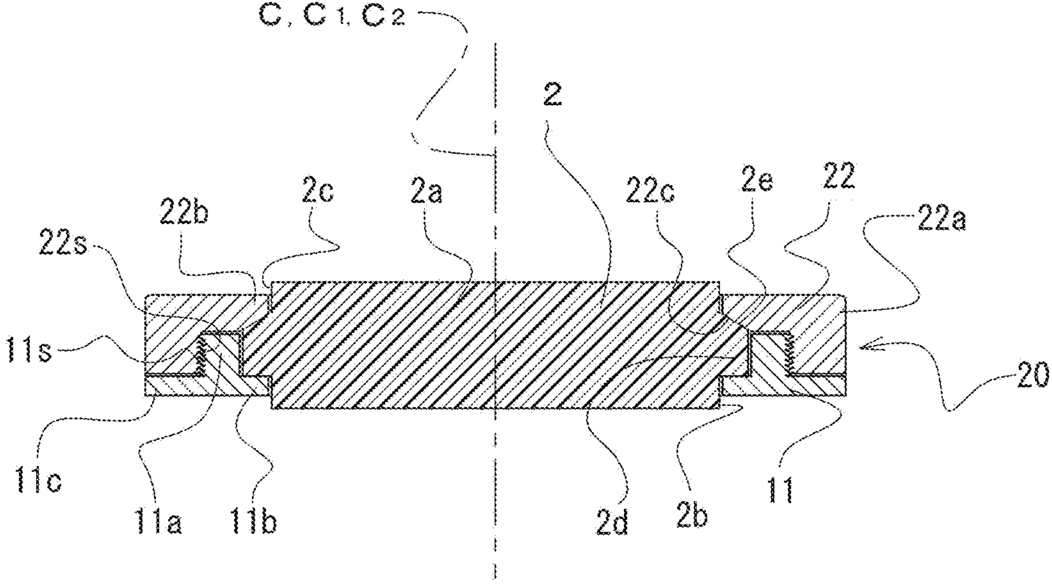
FIG. 6 It is a cross-sectional view explaining the modification of the processing block according to the second embodiment, showing a state where the processing block is held by an annular holding member, cut along a plane including the axis of the processing block.

FIG. 6 shows a modified example of the second embodiment, in which the same parts as those of the second embodiment are designated by the same reference numerals as those of FIG. 5. The processing block 2 according to this modified example is different from the processing block 1 described above. That is, the processing block 2 has a workpiece 2*a* different from the workpiece 1*a*. At the lower part of the processing block 2, there is provided a lower protrusion 2*b* protruding downward from the accommodating side holding member 11. On the upper portion of the workpiece 2*a*, there is provided an upper protrusion 2*c* protruding upward from the pressing side holding member 12. That is, the thickness of the workpiece 2*a* of the processing block 2 is larger than that of the workpiece 1*a* of the processing block 1 shown in FIG. 1. For this reason, it is possible to process a large dental prosthesis as compared with the case of the processing block 1. The workpiece 2*a* is provided with a flange 2*d* corresponding to the flange 1*b*, and is provided with a holding surface 2*e* corresponding to the holding surface 1*c*.

Third Embodiment

Figure 7A:
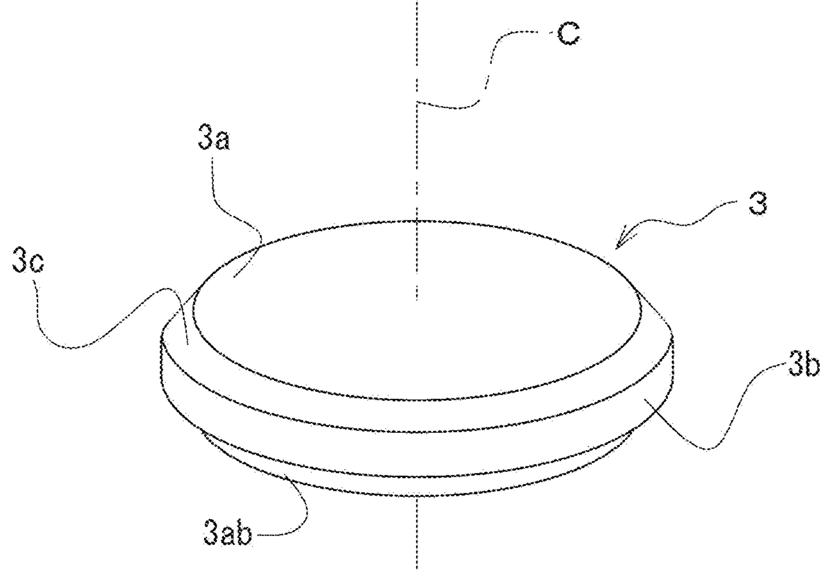
FIG. 7A It is a perspective view showing a processing block according to the third embodiment of this invention.
Figure 7B:
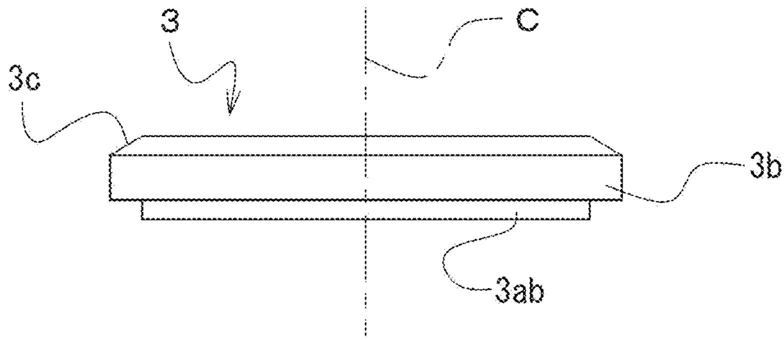
FIG. 7B It is a front view of the processing block shown in FIG. 7A.

FIGS. 7A and 7B show a processing block 3 according to the third embodiment, wherein FIG. 7A is a perspective view of the processing block 3, and FIG. 7B is a front view of the processing block 3.

The processing block 3 has a shape in which there is not formed the upper protrusion 1*at* protruding upward from the holding surface 1*c* of the workpiece 1*a* of the processing block 1 according to the first embodiment shown in FIG. 1. That is, there is formed a flange 3*b* at the upper end of the workpiece 3*a*, and provided with a holding surface 3*c* by an inclined surface on the upper surface of the flange 3*b*. Therefore, the holding surface 3*c* is formed by an inclined surface extending to the upper surface of the workpiece 3*a* and the side surface of the flange 3*b*. The holding surface 3*c* may be formed such that the lower end thereof is arranged at a radial intermediate portion of the flange 3*b* and the holding surface 3*c* extends from there to the workpiece 3*a*. The upper end of the holding surface 3*c* may be arranged at a radial intermediate portion in the direction of the flange 3*b* and the holding surface 3*c* extends from there to the outer peripheral end of the flange 3*b*. Further, the holding surface 3*c* may be provided only at a radial intermediate portion of the flange 3*b*.

The holding surface 3*c* is formed on the side surface of the cone similarly to the holding surface 1*c*. There is formed a lower protrusion 3*ab* in the lower portion of the workpiece 3*a* protruding downward from the lower surface of the flange 3*b*.

Similar to the holding surface 1*c*, the holding surface 3*c* has an inclination angle within the range of 3 to 87 degrees, preferably 5 to 85 degrees, and more preferably 10 to 80 degrees with respect to the axis C of the processing block 3.

Figure 8:
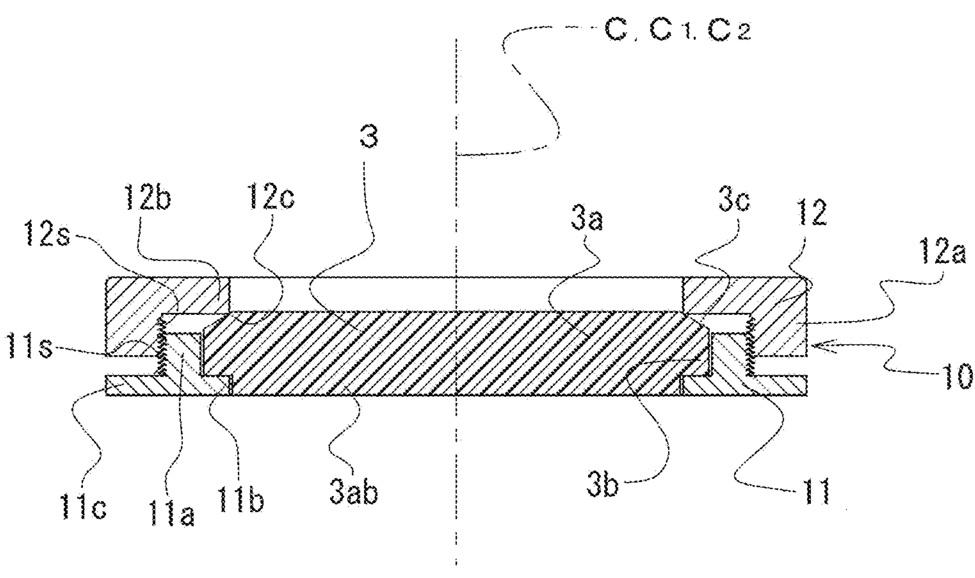
FIG. 8 It is a cross-sectional view showing a state where the processing block according to the third embodiment is held by an annular holding member, cut along a plane including the axis of the processing block.

FIG. 8 shows the processing block 3 being held by the annular holding member, wherein the annular holding member is the same as the annular holding member 10 according to the first embodiment shown in FIGS. 3A and 3B.

That is, the annular holding member 10 is composed of the accommodating side holding member 11 and the pressing side holding member 12. By engaging the pressing side holding member 12 with the accommodating side holding member 11, the facing peripheral edge 12*c* formed by the tip of the corner of the pressing side holding member 12 comes into contact with the holding surface 3*c* of the processing block 3. Then, by tightening the pressing side holding member 12 to the accommodating side holding member 11, the axis C1 of the accommodating side holding member 11 and the axis C2 of the pressing side holding member 12 coincide with the axis C of the processing block so that the processing block 3 and the processing device will be aligned at those axes.

Figure 9:
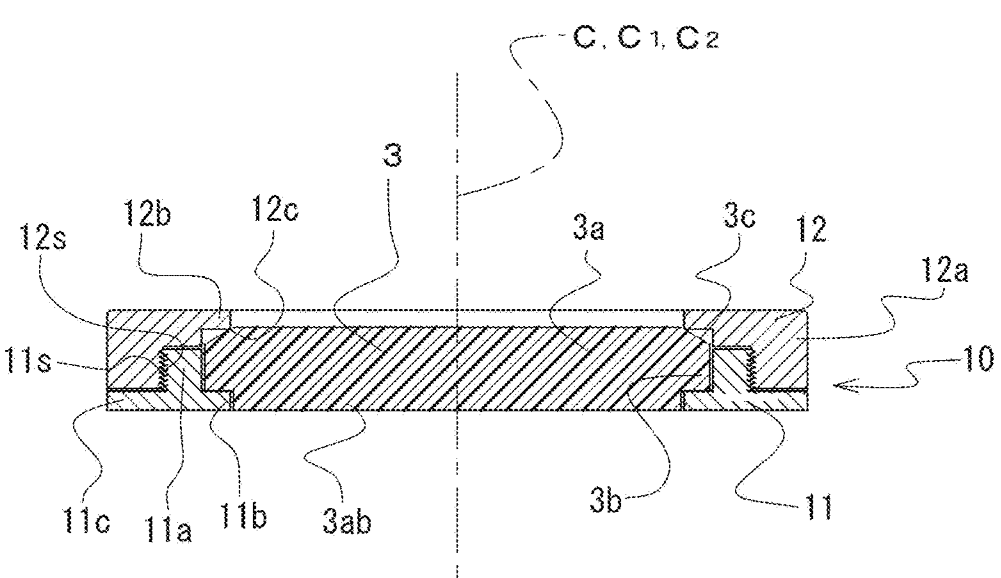
FIG. 9 It is a cross-sectional view showing a state where the processing block according to the third embodiment is held by the annular holding member of a shape different from the annular holding member shown in FIG. 8.

In the state where the processing block 3 is held by the annular holding member 10, the upper surface of the workpiece 3*a* is located below the upper surface of the pressing side holding member 12, as shown in FIG. 8. FIG. 9 shows the processing block 3 being held by the pressing side holding member 12 which has a shape provided with the notch 12*d*, similar to the shape shown in FIG. 4. In this case, the distance from the upper surface of the pressing side holding member 12 to the upper surface of the workpiece 3*a* is smaller than that of the pressing side holding member 12 having the shape shown in FIG. 8, so that a processing jig provided in the processing device can easily reach the workpiece 3*a*.

Fourth Embodiment

Figure 10:
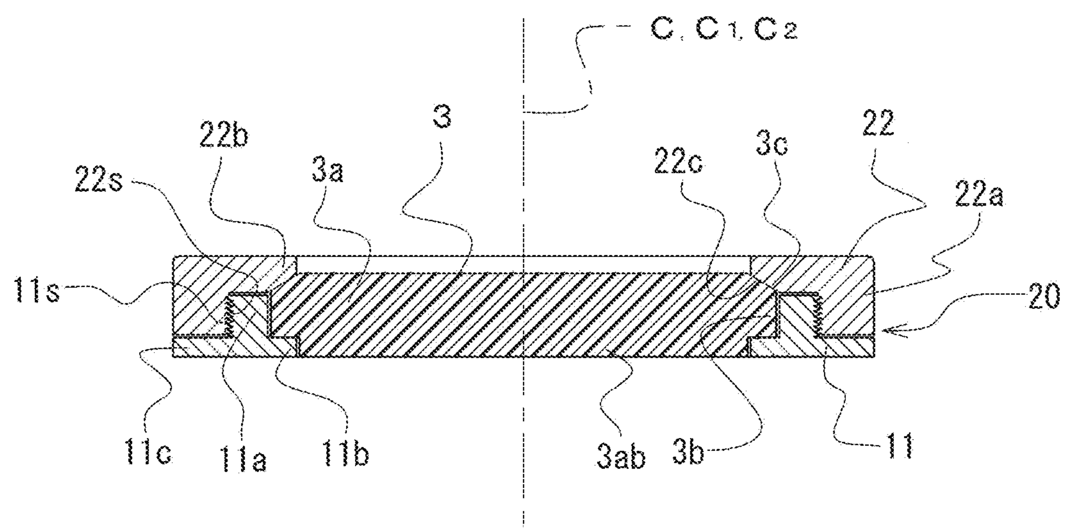
FIG. 10 It is a cross-sectional view showing a state where a processing block according to the fourth embodiment is held by an annular holding member, cut along a plane including the axis of the processing block.

FIG. 10 shows the fourth embodiment in which the annular holding member according to this embodiment is the same as a pressing side holding member 22 according to the second embodiment shown in FIG. 2 including the accommodating side holding member 11 and the pressing side holding member 22. That is, the facing peripheral edge 22*c* of the pressing side holding member 22 is formed on the inner surface of a cone having a shape overlapping the cone forming the holding surface 3*c* of the processing block 3.

In the case where the facing peripheral edge 22*c* in this case has a cone shape overlapping the holding surface 3*c*, the inclination angle of the facing peripheral edge 22*c* may be within the range of 3 to 87 degrees, preferably 5 to 85 degrees, and more preferably 10 to 80 degrees, similarly to that of the holding surface 3*c*. The facing peripheral edge 22*c* may be provided at an inclination angle different from that of the holding surface 1*c*. The facing peripheral edge 22*c* may have a linear or curved cross-sectional shape cut along the plane including the axis C of the processing block 1, and have a shape including a straight line and a curved line.

By screwing the female screw 12*s* of the pressing side holding member 22 with the male screw 11*s* of the accommodating side holding member 11 to advance it with respect to the accommodating side holding member 11, the inner surface of the cone of the facing peripheral 22*c* comes to abut and contact closely with the side surface of the cone of the holding surface 3*c*. Consequently, the axis C of the processing block 3, the axis C1 of the accommodating side holding member 11 and the axis C2 of the pressing side holding member 22 coincide with each other so that the processing block 3 and the processing device are aligned at those axes.

Modification Example of Fourth Embodiment

Figure 11:
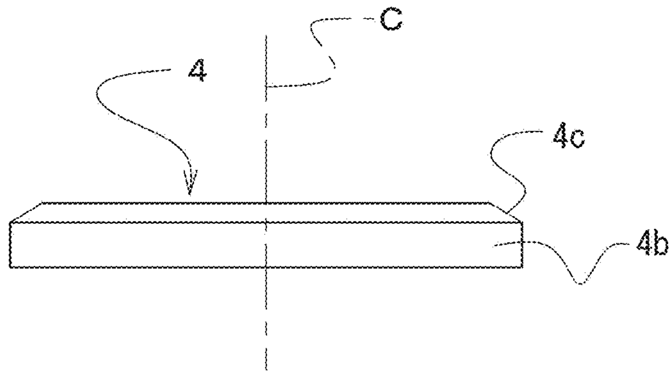
FIG. 11 It is a front view of a modification of the processing block according to the fourth embodiment.
Figure 12:
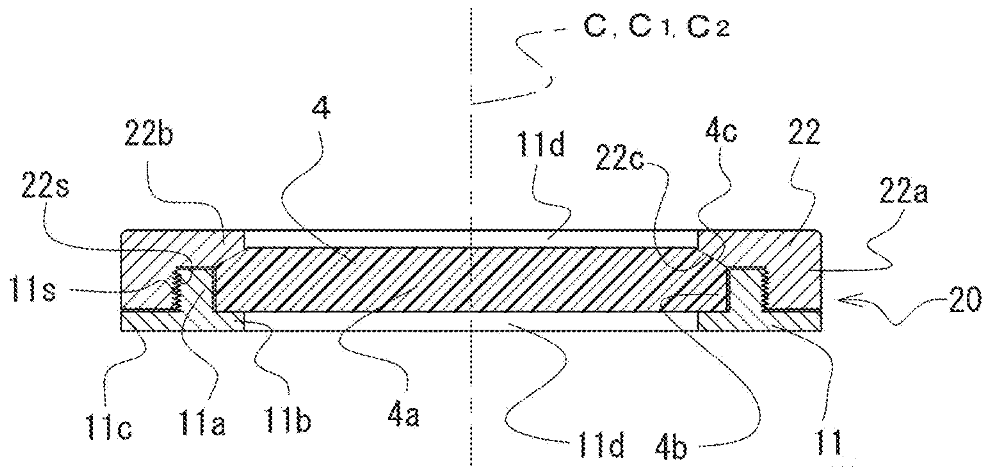
FIG. 12 It is a cross-sectional view showing a state where the processing block shown in FIG. 11 is held by an annular holding member, cut along a plane including the axis of the processing block.

FIG. 11 shows the processing block 3 according to the modification of the third embodiment shown in FIG. 10, in which the lower protrusion 3*ab* of the workpiece 3*a* is not formed. That is, as shown in FIG. 12, the processing block 4 is provided with a holding surface 4*c* by an inclined surface on the upper surface of the flange 4*b*. The holding surface 4*c* may be formed such that the lower end thereof is arranged at a radial intermediate portion of the flange 4*b* and the holding surface 4*c* is formed from there to the workpiece 4*a*. The upper end of the holding surface 4*c* may be arranged at a radial intermediate portion of the flange 4*b* and the holding surface 4*c* extends from there to the outer peripheral end of the flange 4*b*. Further, the holding surface 4*c* may be provided only at a radial intermediate portion of the flange 4*b*.

FIG. 12 is a cross-sectional view showing a state in which the processing block 4 is held by the annular holding member. The annular holding member is the same as the annular holding member 20 shown in FIG. 10, composed of the accommodating side holding member 11 and the pressing side holding member 22. In the state where the processing block 4 is held by the annular holding member 20, the flange 4*b* is placed on the accommodation flange 11*b* of the accommodation side holding member 11. In this state, there is no portion of the workpiece 4*a* projecting downward from the upper surface of the accommodating flange 11*b* in the inner peripheral side of the accommodating flange 11*b* so that a space is formed up to the lower side surface of the accommodating flange 11*b* of the accommodation side holding member 11. Therefore, the space 11*d* is formed above the upper board surface and below the lower board surface of the workpiece 3*a*. The processing block 4 is even thinner than the workpiece 3*a* of the processing block according to the third embodiment so that it becomes suitable for processing a small dental prosthesis rather than the processing block 3 according to the third embodiment.

As the annular holding member for holding the processing block 3, it can also be used the accommodating side holding member 11 and the pressing side holding member 12. If the annular holding member 10 is used, the pressing side holding member 12 may have either shape in which the notch 12*d* is not formed or is formed.

Fifth Embodiment

Figure 13:
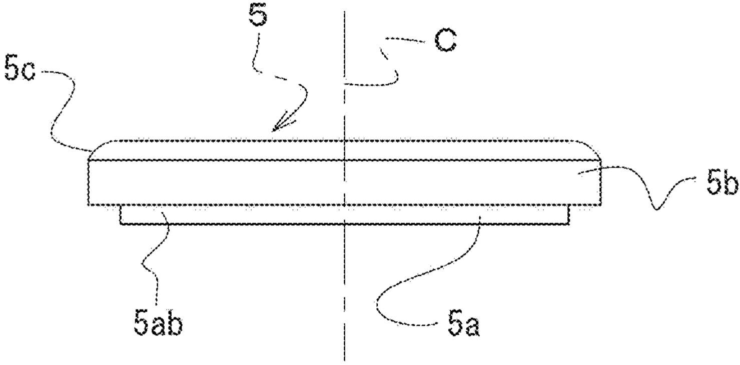
FIG. 13 It is a front view of a processing block according to the fifth embodiment of this invention.
Figure 14A:
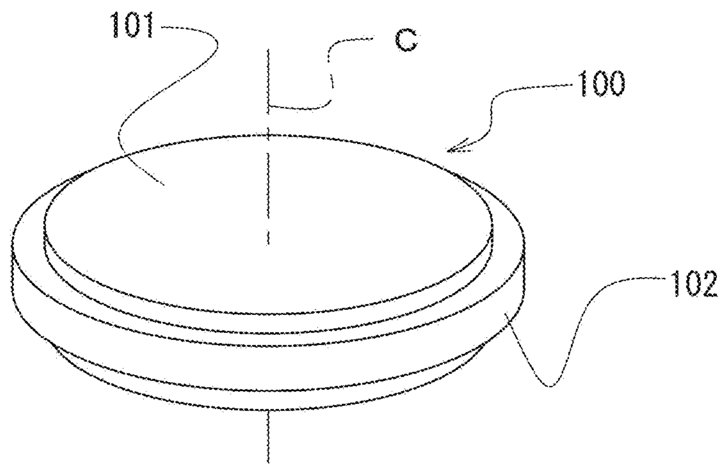
FIG. 14A It is a perspective view explaining a conventional processing block.
Figure 14B:
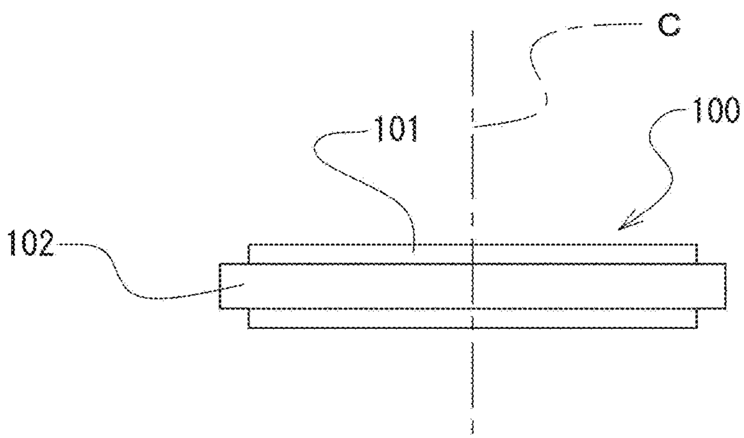
FIG. 14B It is a front view explaining the conventional processing block

FIG. 13 is a front view of the processing block 5 according to the fifth embodiment. The processing block 5 has a holding surface 5*c* different from the holding surface 3*c* formed on the side surface of the cone of the processing block 3 according to the third embodiment shown in FIG. 7B. The holding surface 5*c* is provided with a curved surface such as a spherical surface. The holding surface 5*c* is preferably formed in a shape formed by a part of a spherical surface, but is one of a part of an elliptical sphere, various quadratic curves including one the cross section is a parabola, a high-order curve such as a cubic curve, and a part or parts of various other curved surfaces. That is, the position in the holding surface 5*c* and on the circle centered on the appropriate position on the axis C of the processing block 5 is such that the distance from the lower surface of the flange 5*b* is constant. The holding surface 5*c* may be formed such that the lower end thereof is arranged at a radial intermediate portion of the flange 5*b* and the holding surface 5*c* is formed from there to the workpiece 5*a*. The upper end of the holding surface 5*c* may be arranged at a radial intermediate portion of the flange 5*b* and the holding surface 5*c* extends from there to the outer peripheral end of the flange 5*b*. The holding surface 5*c* may be provided only at a radial intermediate portion of the flange 5*b*. Further, the holding surface 5*c* may be concave with respect to the radial direction of the flange 5*b* rather than convex as shown in FIG. 13.

The shape of the workpiece 5*a* is the same as that of the processing block 3 shown in FIG. 6B, and a lower protrusion 5*ab* is provided on the lower portion of the workpiece 5*a* protruding downward from the flange 5*b*.

As the annular holding member for holding the processing block 5 it can be used the annular holding member 10 having the configuration in which the accommodating side holding member 11 and the pressing side holding member 12 are combined, similarly to the annular holding member 10 shown in FIGS. 3A and 3B according to the first embodiment.

The flange 5*b* of the processing block 5 is placed on the accommodation flange 11*b* of the accommodation side holding member 11, and the processing block 5 is accommodated in the accommodation side holding member 11. By engaging the accommodating side holding member 11 with the pressing side holding member 12 and advancing the pressing side holding member 12 with respect to the accommodating side holding member 11, the facing peripheral edge 12*c* of the pressing side holding member 12 contacts with the holding surface 5*c*. At this time, the facing peripheral edge 12*c*, which is on the circle in the cross section cut along the plane orthogonal to the axis C2 of the pressing side holding member 12, contacts with a part of the holding surface 5*c* on a circle centered on the axis C of the processing block 5. Therefore, the axis C2 of the facing peripheral edge 12*c* and the axis C of the processing block 5 coincide with each other. Therefore, the axis C1 of the accommodating side holding member 11 and the axis C2 of the pressing side holding member 12, and the axis C of the processing block 5 are aligned, and the processing block 5 is positioned at a predetermined position.

Although the processing block 5 shown in FIG. 13 has a shape in which the upper end edge of the holding surface 5*c* coincides with the upper surface of the workpiece 5*a*, it may have a shape in which a part of the workpiece 5*a* protrudes upward above the upper end edge of the holding surface 5*c* as shown in FIG. 1. The thickness of the workpiece 5*a* may be set based on the size of the dental prosthesis to be processed and the like, and may be set such that, as in the modified example shown in FIG. 6, the workpiece 5*a* protrudes below the accommodating side holding member 11 and above the pressing side holding member 12 respectively.

In any of the embodiments described above, it has been described that the holding surface 1*c*, 3*c*, 4*c*, or 5*c* formed by the side surface, the curved surface, or the spherical surface of the cone is arranged on the pressing side holding member 12 or 22. On the other hand, it may be configured that a conical side surface or a spherical mounting surface is formed on the side of the holding side holding member 11 of the processing block 1, 2, 3, 4 or 5 and the processing block 1, 2, 3, 4 or 5 is placed on the side holding member 11. In this case, as in the case of the facing peripheral edge 22*c*, it may be formed a surface having a shape that matches the mounting surface on the upper end edge of the accommodation flange 11*b* of the accommodation side holding member 11.

Further, instead of forming the holding surface 1*c*, 3*c*, 4*c*, or 5*c* described above, only the mounting surface on the accommodating side holding member 11 may be formed on the processing block 1, 2, 3, 4, or 5. In this case, when the pressing side holding member 12 or 22 is tightened to the accommodating side holding member 11, the axis C of the circle on the side surface of the mounting surface and the axis C1 of the circle on the opposite peripheral edge on the accommodating flange 11*b* coincide with each other so that the axis C of the processing blocks 1, 2, 3, 4, or 5 coincides with the axis C of the accommodating side holding member 11 and is positioned at a predetermined position of the processing device.

As described above, any of the processing blocks 1, 2, 3, 4, and 5 is configured such that the facing peripheral edge 12*c* or 22*c* comes into contact pressingly with the holding surface 1*c*, 3*c*, 4*c*, or 5*c* with pressing so that this contact portion can be positioned on the inner peripheral side of the processing blocks 1, 2, 3, 4, or 5. Therefore, since the portion on the outer peripheral side from the contact portion is unnecessary, the outer diameter of the flanges 1*b*, 2*d*, 3*b*, and 4*b* can be made smaller than the outer diameter of the flange 102 of the conventional processing block 100.

As materials for the disk-shaped processing blocks used for processing dental prostheses, it can be used ones generally used as dental prostheses, such as ceramic materials including zirconia and lithium disilicate, metal materials including titanium and cobalt chrome, resin-based materials including PMMA, PEEK, and hybrid resin, and wax-based materials. In the case of a processing block used for a processed product other than a dental prosthesis, it can be used these materials and other materials required for such a processed product.

As described above, according to the processing block of the present invention, it is possible to easily align the processing reference of the processing device with the axis of the disk-shaped processing block when the block is applied to the processing device. It contributes to the improvement of yield and productivity when processing a processing block by reducing processing mistakes and waste of the material.

The invention claimed is:

1. A system comprising:

a disk-shaped processing block;

a holding device for holding the disk-shaped processing block in a predetermined position in a processing machine during processing the disk-shaped processing block into a product in a desired shape, wherein:

the holding device includes:

a ring-shaped holding member that includes a receiving-side holding member disposed, with respect to the processing block, on one side of the processing block in an axial direction thereof, a pressing-side holding member disposed, with respect to the processing block, on the other side of the processing block in the axial direction thereof, and an engagement mechanism for freely engaging and disconnecting the receiving-side holding member and the pressing-side holding member with each other;

the disk-shaped processing block is held detachably by engaging and disengaging the engagement mechanism while the disk-shaped processing block is between the receiving-side holding member and the pressing-side holding member;

the disk-shaped processing block comprising:

a columnar workpiece;

a flange protruding from a peripheral surface of the workpiece and having, on an upper surface thereof, a holding surface provided so as to form a part of a side surface of a cone, wherein the system is configured such that, when the disk-shaped processing block is held by the holding device, the holding surface abuts a facing peripheral edge, which is an end portion on a processing-block side of an inner peripheral surface of the pressing-side holding member, thereby positioning an axial center of the disk-shaped processing block.

2. The system according to claim 1, wherein the holding surface is provided in a curved surface.

3. The system according to claim 1, wherein the processing block is a dental CAD/CAM block.

* * * * *